(12) United States Patent
Muller et al.

(10) Patent No.: US 8,070,851 B2
(45) Date of Patent: Dec. 6, 2011

(54) CHLORIDE HEAP LEACHING

(75) Inventors: Elmar L. Muller, Randburg (ZA); Petrus Basson, Randburg (ZA); Michael J. Nicol, Randburg (ZA)

(73) Assignee: BHP Billiton SA Limited (ZA)

( * ) Notice: Subject to any disclaimer, the term of this patent is extended or adjusted under 35 U.S.C. 154(b) by 186 days.

(21) Appl. No.: 12/266,028

(22) Filed: Nov. 6, 2008

(65) Prior Publication Data

US 2009/0173188 A1    Jul. 9, 2009

Related U.S. Application Data

(63) Continuation of application No. PCT/ZA2007/000025, filed on May 9, 2007.

(30) Foreign Application Priority Data

May 12, 2006   (ZA) .................................. 2006/03788

(51) Int. Cl.
*C22B 3/00* (2006.01)
*C22B 3/04* (2006.01)
*C22B 3/06* (2006.01)
*C22B 3/08* (2006.01)
*C22B 3/10* (2006.01)
*C22B 15/00* (2006.01)

(52) U.S. Cl. ................. 75/743; 423/23; 423/27; 423/38; 423/41; 423/43; 423/45; 423/46

(58) Field of Classification Search ............ 75/743; 423/23, 27, 38, 41, 43, 45, 46
See application file for complete search history.

(56) References Cited

U.S. PATENT DOCUMENTS

| | | | | |
|---|---|---|---|---|
| 3,879,272 | A | * | 4/1975 | Atwood et al. ............... 205/582 |
| 3,957,602 | A | | 5/1976 | Johnson et al. |
| 4,276,084 | A | * | 6/1981 | Reynolds et al. ............... 75/717 |
| 4,571,387 | A | | 2/1986 | Bruynesteyn et al. |
| 4,971,662 | A | * | 11/1990 | Sawyer et al. ................ 205/581 |
| 5,316,567 | A | | 5/1994 | Jones |
| 6,277,341 | B1 | | 8/2001 | Pinches et al. |
| 6,569,391 | B1 | | 5/2003 | Arias |
| 6,802,888 | B2 | * | 10/2004 | Kohr et al. ....................... 75/712 |
| 2004/0144209 | A1 | * | 7/2004 | Faine et al. ...................... 75/743 |
| 2005/0044990 | A1 | * | 3/2005 | Shaw et al. ...................... 75/711 |

FOREIGN PATENT DOCUMENTS

| | | |
|---|---|---|
| AU | 749257 | 6/2002 |
| CL | 40891 | 5/1997 |
| CL | 41897 | 11/1997 |

(Continued)

OTHER PUBLICATIONS

Sato et al., The Electrochemical Mechanism of Sulfide Self-Potentials, Feb. 1960, Geophysics, vol. 25, No. 1, pp. 226-249.*

(Continued)

*Primary Examiner* — Jerry Lorengo
*Assistant Examiner* — Jared Wood
(74) *Attorney, Agent, or Firm* — Brinks Hofer Gilson & Lione; G. Peter Nichols

(57) ABSTRACT

A heap leaching method to recover copper from a primary copper sulphide mineral wherein the mineral is leached in an acidic chloride/sulphate solution in the presence of oxygen with the surface potential of the mineral below 600 mV (vs. SHE) to cause dissolution of the copper sulphide.

12 Claims, 9 Drawing Sheets

Primary Sulphur (S°)

Secondary Sulphur (S°)

Proposed Elemental Sulphur Formation Routes in Direct Anodic Oxidation and Non-Oxidative / Oxidative Dissolution of Chalcopyrite

FOREIGN PATENT DOCUMENTS

| | | |
|---|---|---|
| CL | 1665-2003 | 8/2003 |
| EP | 1 424 403 | 6/2004 |
| JP | 2003328051 | 11/2003 |
| WO | WO98/39491 | 9/1998 |
| WO | WO03/038137 | 5/2003 |
| WO | WO03/091463 | 11/2003 |
| WO | WO2005/031012 | 4/2005 |
| WO | WO2005/056842 | 6/2005 |
| WO | WO2005/118894 | 12/2005 |
| WO | WO2006/070052 | 7/2006 |
| WO | WO2007/042604 | 4/2007 |
| WO | WO 2007042604 A1 * | 4/2007 |

OTHER PUBLICATIONS

Lazaro I. et al., "A rotating ring-disk study of the initial stages of the anodic dissolution of chalcopyrite in acidic solutions", Journal of Applied Electrochemistry, Kluwer Academic Publishers, DO, vol. 36, No. 4, Apr. 1, 2006, pp. 425-431, XP019247530 ISSN: 1572-8838.

Padilla et al., "Leaching of enargite in $H_2SO_4$-NaCl-$O_2$ Media", Hydrometallurgy, Elsevier Scientific Publishing CY., Amsterdam, NL, vol. 80, No. 4, Dec. 30, 2005, pp. 272-279, XP005182654 ISSN: 0304-386X.

Nicol et al., The role of $E_h$ measurements in the interpretation of the kinetics and mechanisms of the oxidation and leaching of sulphide minerals, Hydrometallurgy, Elsevier Scientific Publishing CY., Amsterdam, NL, vol. 63, No. 1, Jan. 2002, pp. 15-22, XP004330999 ISSN: 0304-386X.

Lu Z. et al., "The effect of chloride ions on the dissolution of chalcopyrite in acidic solutions", Hydrometallurgy, Elsevier Scientific Publishing CY., Amsterdam, NL, vol. 56, No. 2, Jun. 2000, pp. 189-202.

Dutrizac, J.E., "The Leaching of Sulphide Minerals in Chloride Media", Hydrometallurgy, vol. 29, 1992, pp. 1-45.

Hirato et al., The Leaching of Chalcopyrite with Ferric Chloride, Metallurgical Transactions, vol. 17B, Mar. 1986, pp. 19-28.

Majima et al., "The Leaching of Chalcopyrite in Ferric Chloride and Ferric Sulfate Solutions", (Abstract) Canadian Metallurgical Quarterly, 1985, pp. 283-291.

M.J. Nicol, "Kinetics of the Oxidation of Copper(I) by oxygen in acidic chloride solutions", S. Afr. Tydskr. Chem., 1984, pp. 77-80.

* cited by examiner

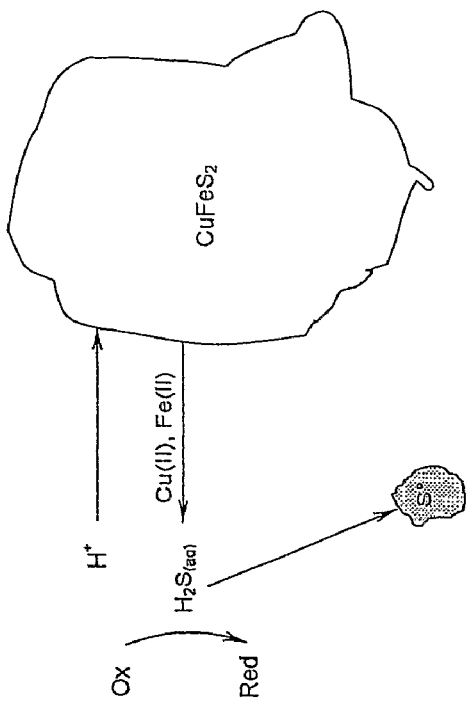
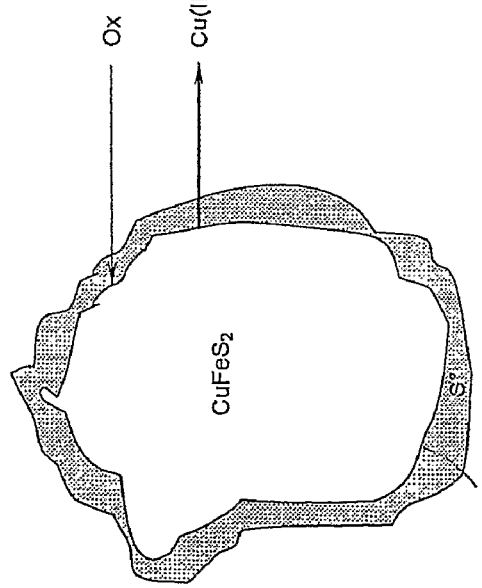
Figure 1 : Proposed Elemental Sulphur Formation Routes in Direct Anodic Oxidation and Non-Oxidative / Oxidative Dissolution of Chalcopyrite

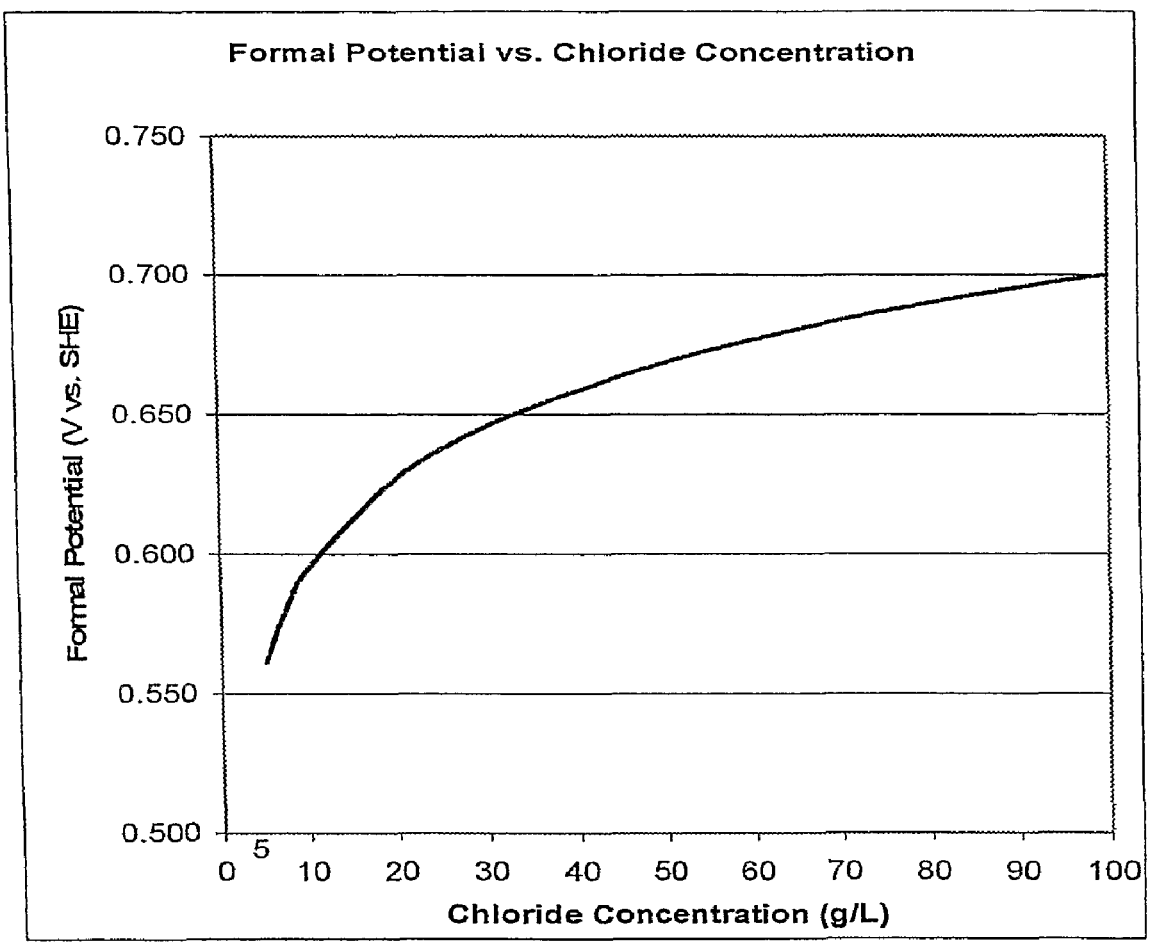
Figure 2 : The Effect of Chloride on the Formal Potential of the Cu(II) / Cu(I) Couple

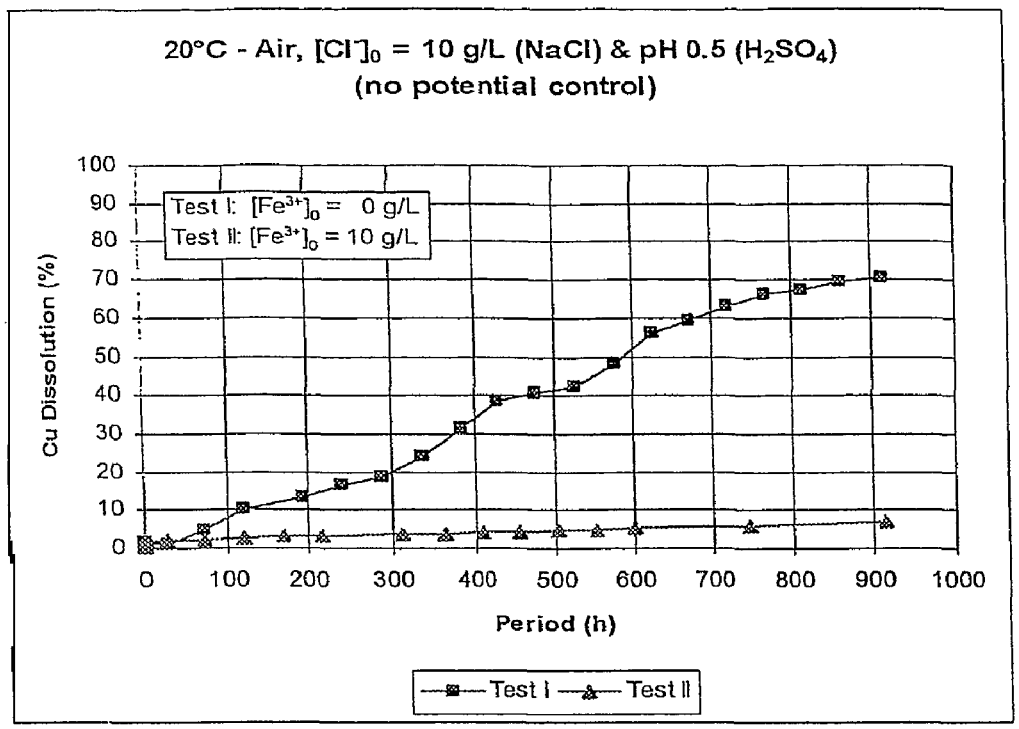
Figure 3(a) : The Effect of Potential on the Rate of Chalcopyrite Dissolution
(Copper Dissolution Transients)
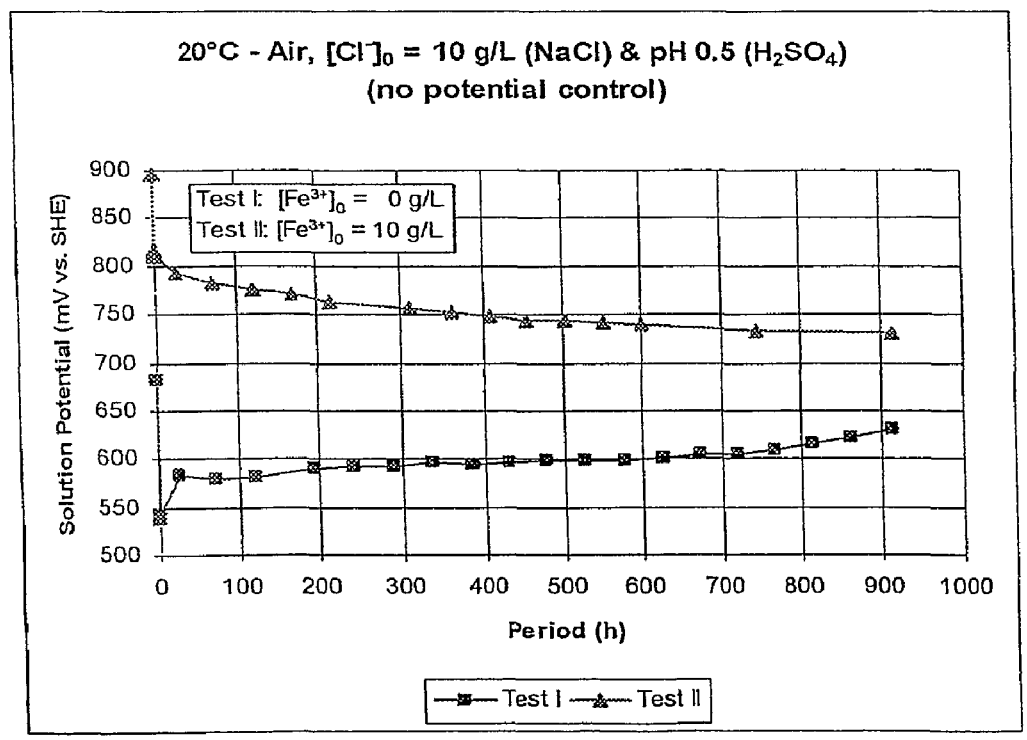
Figure 3(b) : The Effect of Potential on the Rate of Chalcopyrite Dissolution
(Solution Potential Transients)

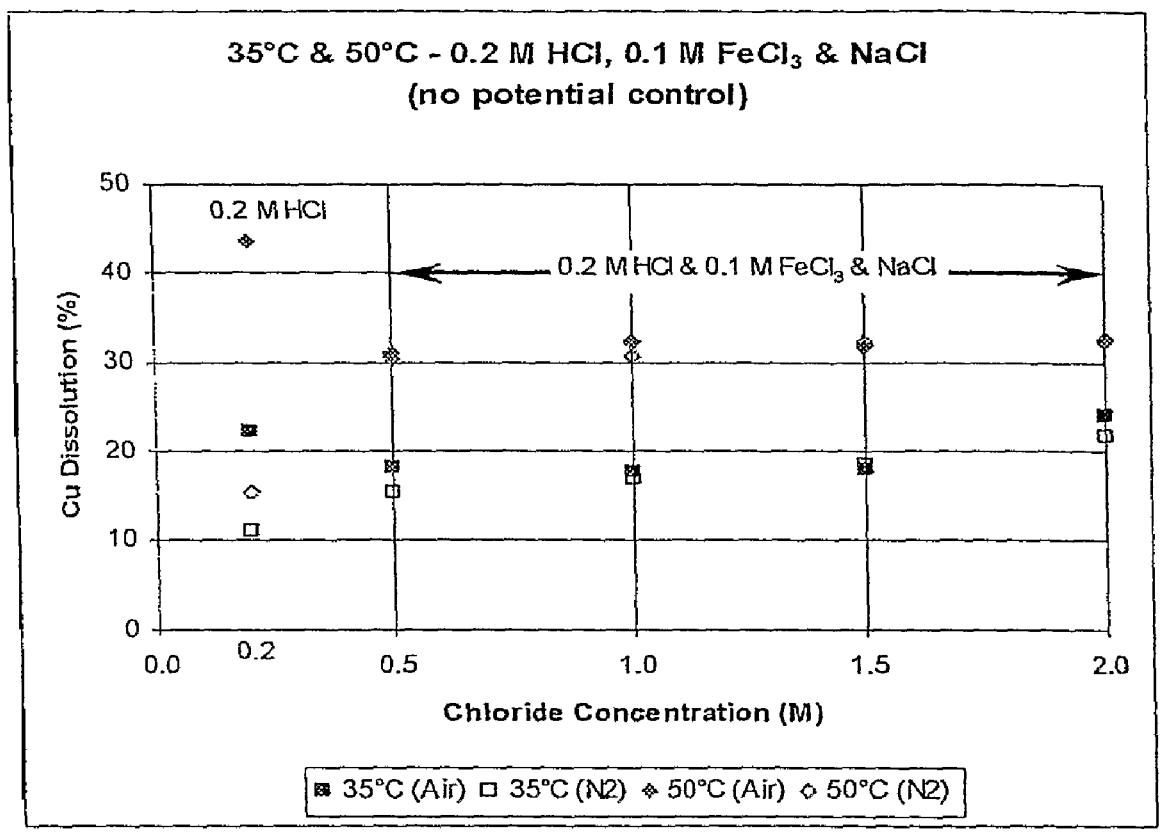
Figure 4 : The Effect of Dissolved Oxygen on the Rate of Chalcopyrite Dissolution (24 h Overall Copper Dissolutions)

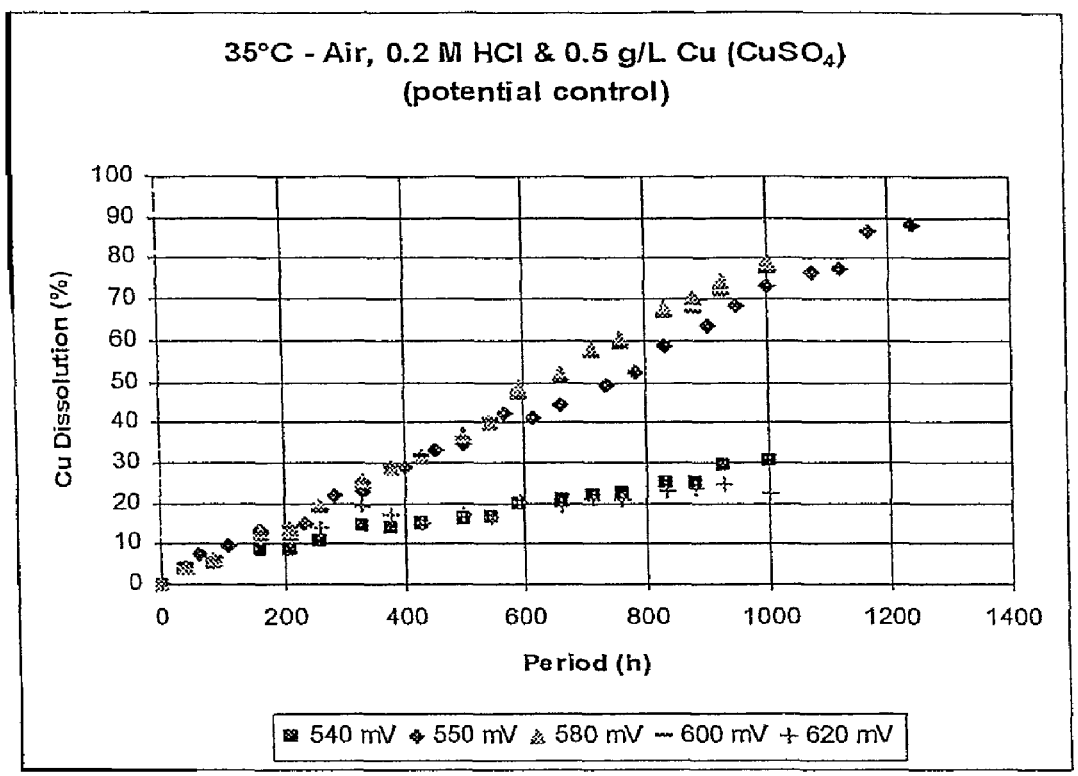
Figure 5 : The Effect of Controlled Potential on the Rate of Chalcopyrite Dissolution

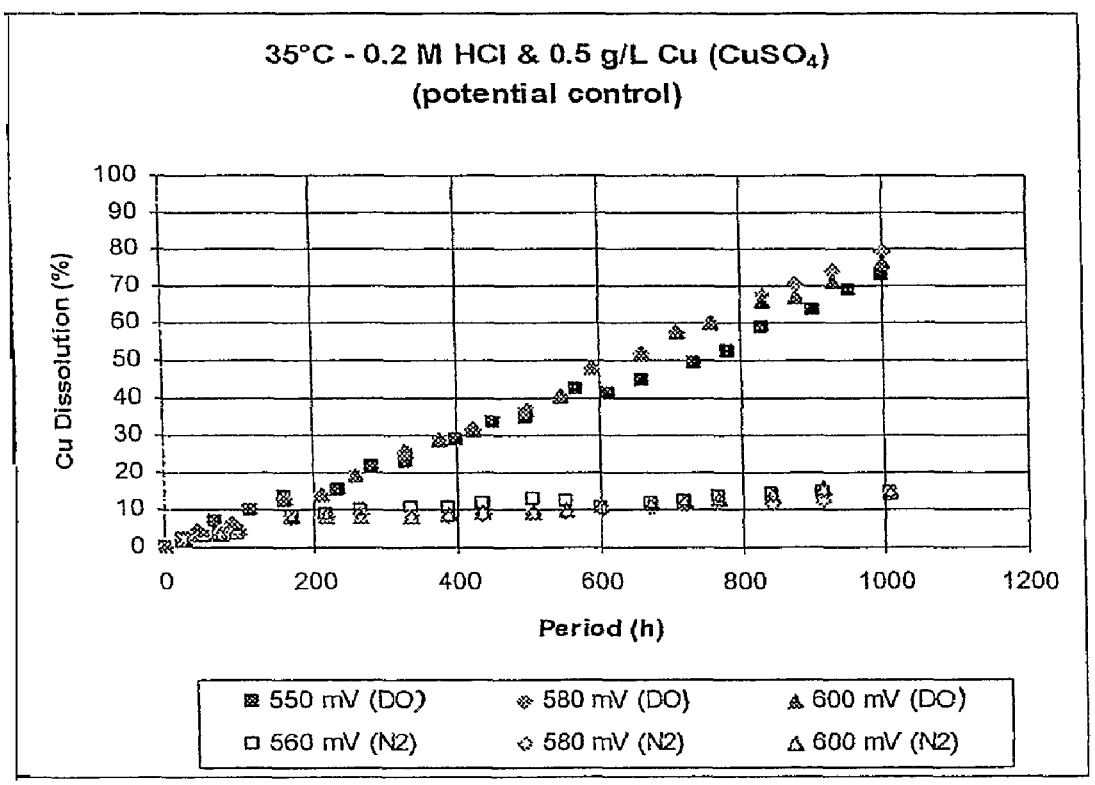
Figure 6 : The Effect of Dissolved Oxygen on the Rate of Chalcopyrite Dissolution at Controlled Optimum Potential Conditions

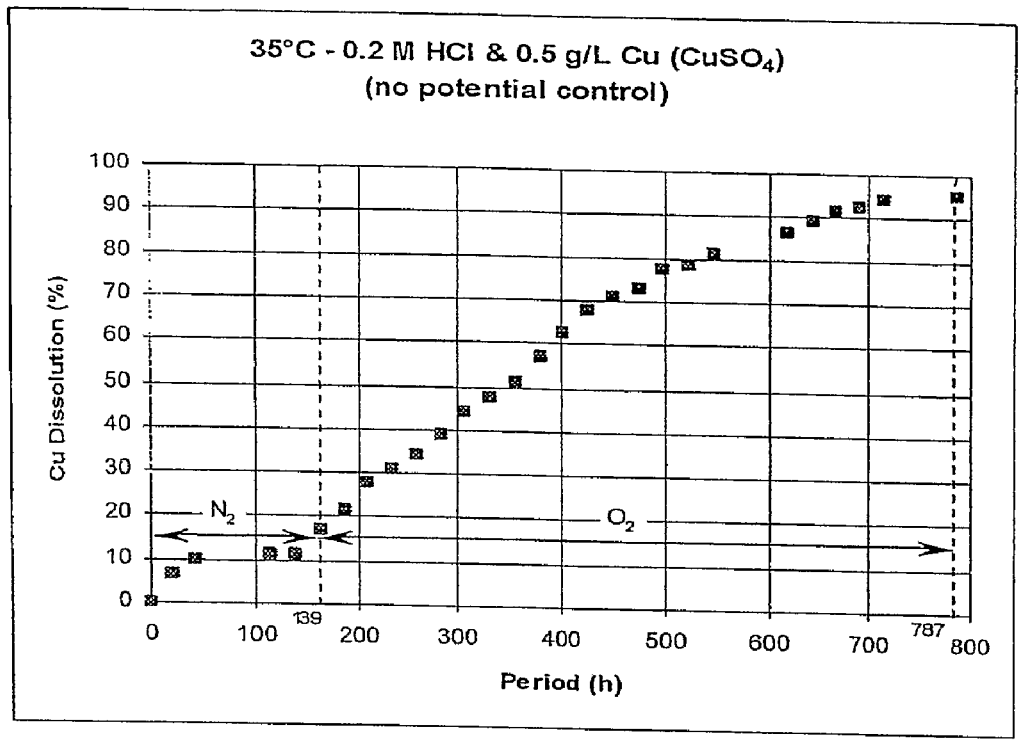
Figure 7(a) : Two-Stage (Reductive / Oxidative) Leach - Copper Dissolution Transient
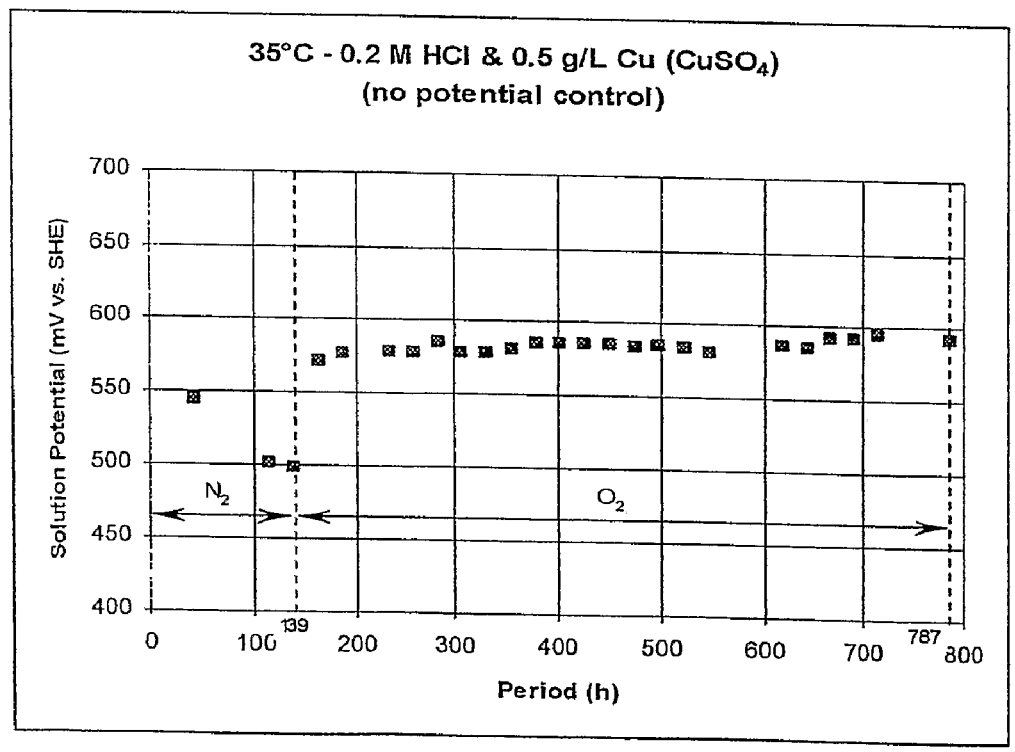
Figure 7(b) : Two-Stage (Reductive / Oxidative) Leach - Solution Potential Transient

CHLORIDE HEAP LEACHING

This application is a continuation of PCT/ZA2007/000025 filed May 9, 2007 published in English as WO 2007/134343 on Nov. 22, 2007, which claims priority to ZA 2006/03788 filed May 12, 2006.

BACKGROUND OF THE INVENTION

This invention relates to a hydrometallurgical method for the recovery of copper from copper sulphide minerals such as bornite, chalcocite, chalcopyrite, covellite and enargite.

Chalcopyrite is one of the most refractory copper sulphide minerals in relation to leaching in acidic ferric chloride and ferric sulphate systems at low temperature. This is exemplified by the mineral's slow leaching kinetics, which level off with time. This has been attributed to a process of "passivation", but uncertainty in regard to the mechanism still remains.

It has been shown that the oxidative dissolution of chalcopyrite is a potential-dependent process and that the onset of "passivation" seems to occur at a surface potential (mixed potential) in excess of about 0.6 V (vs. SHE). Studies have also shown that under typical ferric leaching conditions, such as bioleaching and atmospheric leaching in ferric chloride and ferric sulphate systems, the mixed potential of the mineral is normally fixed in the so-called "passive region" of the anodic oxidation process, at conventional solution potentials in the region of 800 mV (vs. SHE) to 900 mV (vs. SHE), as measured against an inert platinum electrode. In this potential region, the mineral is subjected to the process of "passivation", which is typified by the leveling-off of the leaching kinetics. This defines the fundamental problem of oxidative dissolution of chalcopyrite in such systems.

Many methods have been suggested to alleviate the problem of "passivation", one of which is thermophile bioleaching at elevated temperatures. In one approach, bioleaching is carried out in a heap of low-grade, chalcopyrite-bearing ores. The process is operated in such a way that the heap temperature is raised sequentially from atmospheric to moderate thermophile or thermophile levels to achieve improved rates of chalcopyrite dissolution. The success of this strategy depends to a large extent on sufficient levels of available pyrite present in the ore and the successful oxidation thereof to achieve the required heat generation.

A number of prior art techniques have been proposed for the recovery of copper from chalcopyrite. These include the methods in:
(a) U.S. Pat. No. 6,277,341, wherein ferric sulphate is used as an oxidant and the surface potential of the chalcopyrite is controlled in the region of 350-450 mV (vs. SCE);
(b) WO03038137A, which describes a reductive process followed by an oxidative process, using at least ferric and oxygen to oxidize sulphur in chalcopyrite;
(c) a patent to UBC, which describes a chalcopyrite-concentrate leaching process with pyrite as a catalyst in a sulphate lixiviant, at a temperature in excess of 50° C.;
(d) a patent to CYPRUS, which describes the reaction of copper sulphate with chalcopyrite concentrate at elevated temperatures to form insoluble copper sulphide, soluble iron sulphate and sulphuric acid, and the leaching of copper sulphide with oxygen in an acid medium, or with ferric or cupric chloride or in an ammoniacal solution; and
(e) CL 40891 which relates to an agglomeration process, suited to supergene ores, with the addition of calcium chloride and stoichiometric quantities of acid. The chloride level is high and the solution is highly acidic.

The aforegoing review is principally in the context of chalcopyrite but similar considerations, to a greater or lesser extent, can be applicable to other copper sulphide minerals.

The recovery of copper from a low-grade, transitional and hypogene ore, which contains insufficient pyrite to generate a heap temperature for moderate thermophile, or thermophile bioleaching, remains problematic.

The invention aims to address, at least partly, this situation. The use of the invention is however not confined to these circumstances and may be extended to the leaching of high-grade concentrates at elevated temperatures.

SUMMARY OF THE INVENTION

The invention provides a method of recovering copper from a material, in a heap, that contains a copper sulphide mineral, which includes the steps of leaching the material in an acidic chloride or a mixed chloride/sulphate solution in the presence of dissolved oxygen, maintaining the mineral's surface potential below 600 mV (vs. SHE) to cause dissolution of the copper sulphide, and recovering copper from the solution.

Preferably, the potential is maintained within the range of 550 mV (vs. SHE) to 600 mV (vs. SHE) for optimum chalcopyrite leaching. The optimum potential value depends on the concentration of chloride.

Depending on the application, the method may be carried out at ambient or at an elevated temperature.

The copper sulphide mineral may include bornite, chalcocite, chalcopyrite, covellite or enargite. These are non-limiting examples.

The method of the invention may be applied to the leaching of copper sulphide in a low-grade, transitional and hypogene ore. The use of the invention is however not confined to these ore types and may include the leaching of low-grade supergene ores. In all of these cases, the leaching may be carried out in an ore column, dump, heap or vat, collectively referred to herein, for the sake of convenience as "a heap".

The pH of the solution may be less than 3 and preferably is between pH 1 and pH 2. The pH may be controlled in any appropriate way, for example by the addition of $H_2SO_4$, HCl or $HNO_3$.

The dissolved oxygen level is preferably in excess of 1 ppm.

The chloride concentration may be controlled at a level of 5 to 100 g/L added via HCl or any suitable chloride salt including NaCl, $MgCl_2$, saline water ("salares"), sea water or chloride containing process water.

In general terms, the mineral's surface potential can be controlled by manipulating variables within the leaching system. In one approach, the ratio of Cu(II) to Cu(I) is controlled. When the method of the invention is applied to a column, dump, heap or vat leaching situation, then the ratio of Cu(II) to Cu(I) within a leach lixiviant is manipulated.

It has been observed that the leaching kinetics remain remarkably linear under the conditions defined by the method of the invention and that there is little or no indication of "passivation". Thus, the rate of dissolution of the copper-bearing mineral remains constant and, over time, results in substantially complete dissolution.

It has also been observed that under the defined conditions copper and iron dissolve in near stoichiometric quantities from a chalcopyrite mineral.

In the case of chalcopyrite, dissolution may possibly occur in accordance with the following scheme of reactions, which comprises a sequential non-oxidative/oxidative process:
Non-Oxidative Process

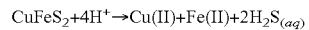

$$CuFeS_2 + 4H^+ \rightarrow Cu(II) + Fe(II) + 2H_2S_{(aq)} \qquad (1)$$

or $$CuFeS_2 + 2H^+ \rightarrow CuS + Fe(II) + H_2S_{(aq)} \quad (2)$$

Although Equation 2 is slightly more thermodynamically favourable than Equation 1 in chloride or chloride/sulphate mixed solutions, both equations are used as a starting point in a proposed reaction mechanism and result in the same intermediate oxidation reaction, as reflected in Equation 6, and in the same overall reaction, as set out in Equation 9.

$$Cu(II) + H_2S_{(aq)} \rightarrow CuS + 2H^+ \quad (3)$$

Equations 2 and 3 can be written as:

$$CuFeS_2 + Cu(II) \rightarrow 2CuS + Fe(II) \quad (4)$$

Oxidative Processes $$CuS + \tfrac{1}{2}O_2 + 2H^+ \rightarrow Cu(II) + S° + H_2O \quad (5)$$

From Equations 3 and 5:

$$H_2S_{(aq)} + \tfrac{1}{2}O_2 \rightarrow S° + H_2O \quad (6)$$

This constitutes the copper-catalyzed oxidation of soluble hydrogen sulphide by dissolved oxygen.

Following from Equation 1:

$$4Cu(II) + 2H_2S(aq) \rightarrow 4Cu(I) + 2S° \pm 4H^+ \quad (7)$$

$$4Cu(I) + O_2 + 4H^+ \rightarrow 4Cu(II) + 2H_2O \quad (8)$$

Equations 7 and 8 can be written as:

$$2H_2S_{(aq)} + O_2 \rightarrow 2S° + 2H_2O \quad (6)$$

This constitutes the oxidation of soluble hydrogen sulphide by cupric ion, with regeneration of the oxidant (cupric ion) by oxidation of cuprous to cupric ion by dissolved oxygen.

Equation 6 is the net result of each reaction route. It is believed that, under these conditions, the oxidation of hydrogen sulphide perturbs the equilibrium portrayed in Equation 1 or 2, and results in an overall dissolution process which is given by Equation 9.

Overall Reaction $$CuFeS_2 + O_2 + 4H^+ \rightarrow Cu(II) + Fe(II) + 2S° + 2H_2O \quad (9)$$

Although the applicant is not bound thereby, the preceding proposed reaction mechanism for chalcopyrite dissolution, at conditions of low mixed potential [0.6 V (vs. SHE)], in the presence of dissolved oxygen in chloride or chloride/sulphate mixed systems, is consistent with experimental observations.

In contrast to what is believed to happen at a mixed potential below 0.6 V (vs. SHE), the applicant believes that at potentials above this value and fixed within the "passive region" of the anodic oxidation process, chalcopyrite undergoes direct anodic oxidation according to the following half-cell reaction:

$$CuFeS_2 \rightarrow Cu(II) + Fe(II) + 2S° + 4e^- \quad (10)$$

The overall reactions generally accepted, depending whether cupric (Equation 11) or ferric (Equation 12) ions are employed as oxidants within chloride systems, are:

$$CuFeS_2 + 3Cu(II) \rightarrow 4Cu(I) + Fe(II) + 2S° \quad (11)$$

$$CuFeS_2 + 4Fe(III) \rightarrow Cu(II) + 5Fe(II) + 2S° \quad (12)$$

There are indications from experimental observations that the elemental sulphur (S°) formed by direct anodic oxidation of the chalcopyrite mineral (Equation 10) and that formed via the proposed non-oxidative/oxidative route (Equations 2, 3 and 5) may not be the same.

In addition, mineralogical investigations on leach residue samples have indicated that very little of the sulphur formed during the dissolution process, under conditions of low mixed potential (<0.6 V vs. SHE) and in the presence of dissolved oxygen, is associated with chalcopyrite particles, but occurs mainly as (i) larger globules, and (ii) around smaller size particles of other mineral suphides such as pyrite (FeS$_2$). In other words, it seems that sulphur is formed away from the chalcopyrite mineral's surface. However, under conditions where the mixed potential is in excess of 0.6 V (vs. SHE) and fixed in the "passive region" of the anodic oxidation process, it seems that fine, densely-packed sulphur is formed directly on the mineral's surface. This would mean that a potential-dependent route determines the type (morphology) of sulphur, and also the deportment thereof. This is schematically illustrated in FIG. 1, where the following terminology is used to describe the different types of sulphur believed to form (Table 1).

TABLE 1

Sulphur Formation

| Type (S°) | Mixed Potential (V vs. SHE) | Route | Morphology | Deportment |
|---|---|---|---|---|
| Primary | >0.6 | Anodic oxidation (Equation 10) | Fine, densely-packed particles | On CuFeS$_2$ surface |
| Secondary | ≦0.6 (550 mV to 600 mV) | Non-oxidative/ oxidative (Equations 2, 3 & 5) | Larger, globular particles | Away from CuFeS$_2$ surface (on smaller FeS$_2$ particles) |

The roles of the parameters and constituents of the method of the invention can be summarized as follows:

Chloride
  affects type and morphology of sulphur and deportment thereof;
  stabilizes Cu(I) species which enables Cu(II)/Cu(I) couple to control Eh;
  enhances the thermodynamics of non-oxidative reaction;
  may enhance the rate of the non-oxidative reaction;
  increases formal potential of Cu(II)/Cu(I) couple;
  results in a reduction of the acid required to achieve the same pH;
  affects the rate of oxidation of Cu(I) to Cu(II); and
  affects DO (dissolved oxygen) level.

Copper
  Cu(II) is an oxidant;
  Cu ions catalyze the oxidation of H$_2$S;
  the Cu(II)/Cu(I) couple controls solution potential;
  affects Cu(I) to Cu(II) oxidation;
  the concentration of Cu(II) affects the rate of oxidation of Cu(I) to Cu(II); and
  the rate of oxidation of Cu(I) to Cu(II) is dependent on the concentration of Cu(I).

Dissolved Oxygen
  is an oxidant for oxidation of Cu(I) to Cu(II); and
  allows for Eh control.

Eh
  Eh determines the mixed potential at mineral's surface that controls the mechanism of chalcopyrite dissolution.

Iron
  no direct role in the mechanism.

Acid
  a leaching agent to drive the non-oxidative reaction;
  provides for pH control;

affects kinetics of chalcopyrite dissolution; and
affects the rate of oxidation of Cu(I) to Cu(II).

$H_2S$
   an intermediate product formed in the non-oxidative reaction;
   soluble $H_2S$ diffuses away from chalcopyrite surface; and
   $H_2S$ oxidation gives predominantly secondary elemental $S°$.

Sulphate
   affects pH control; and
   affects DO level.

Altitude
   affects DO.

Agents that May Enhance the Kinetics of Oxidation of $H_2S$
   pyrite;
   magnetite, hematite;
   activated carbon or coal;
   zeolites; and
   silver, bismuth, cadmium and mercury.

BRIEF DESCRIPTION OF THE DRAWINGS

The invention is further described by way of examples with reference to the accompanying drawings.

FIG. 1 is a schematic diagram, which conceptualizes experimental observations in regard to the route of elemental sulphur formation, type (morphology) of sulphur formed, as well as the deportment of the sulphur.

FIG. 2 is a graph which depicts the effect of chloride concentration on the formal potential of the Cu(II)/Cu(I) couple.

FIG. 3($a$) shows graphs of copper dissolution versus time at low solution potential (Test I) and at high solution potential (Test II).

FIG. 3($b$) shows graphs of the corresponding solution potential versus time profiles of Tests I and II.

FIG. 4 shows the results of a series of tests, in which the effect of dissolved oxygen on the rate of chalcopyrite dissolution is demonstrated at low solution potential (in the absence of ferric ions) and high solution potential (in the presence of ferric ions).

FIG. 5 is a graph of copper dissolution versus time, to illustrate the defined solution potential range for optimum chalcopyrite leaching, and to highlight the results achieved when leaching under conditions in accordance with the invention.

FIG. 6 is a comparative graph, which depicts copper dissolution versus time, to illustrate the importance of the presence of dissolved oxygen when leaching within a defined optimum solution potential range.

FIG. 7($a$) shows a graph of copper dissolution versus time, to illustrate the feasibility of a two-stage (reductive/oxidative) leach, in a variation of the invention.

FIG. 7($b$) shows graphs of the corresponding solution potential versus time profile of the two-stage (reductive/oxidative) leach.

FIG. 8($b$) is a schematic diagram which illustrates an alternative heap leaching process wherein the raffinate Eh reduction is achieved by first leaching secondary copper sulphides and thereafter using the leaching solution to leach primary copper sulphides.

DESCRIPTION OF PREFERRED EMBODIMENTS

Figure 8A:
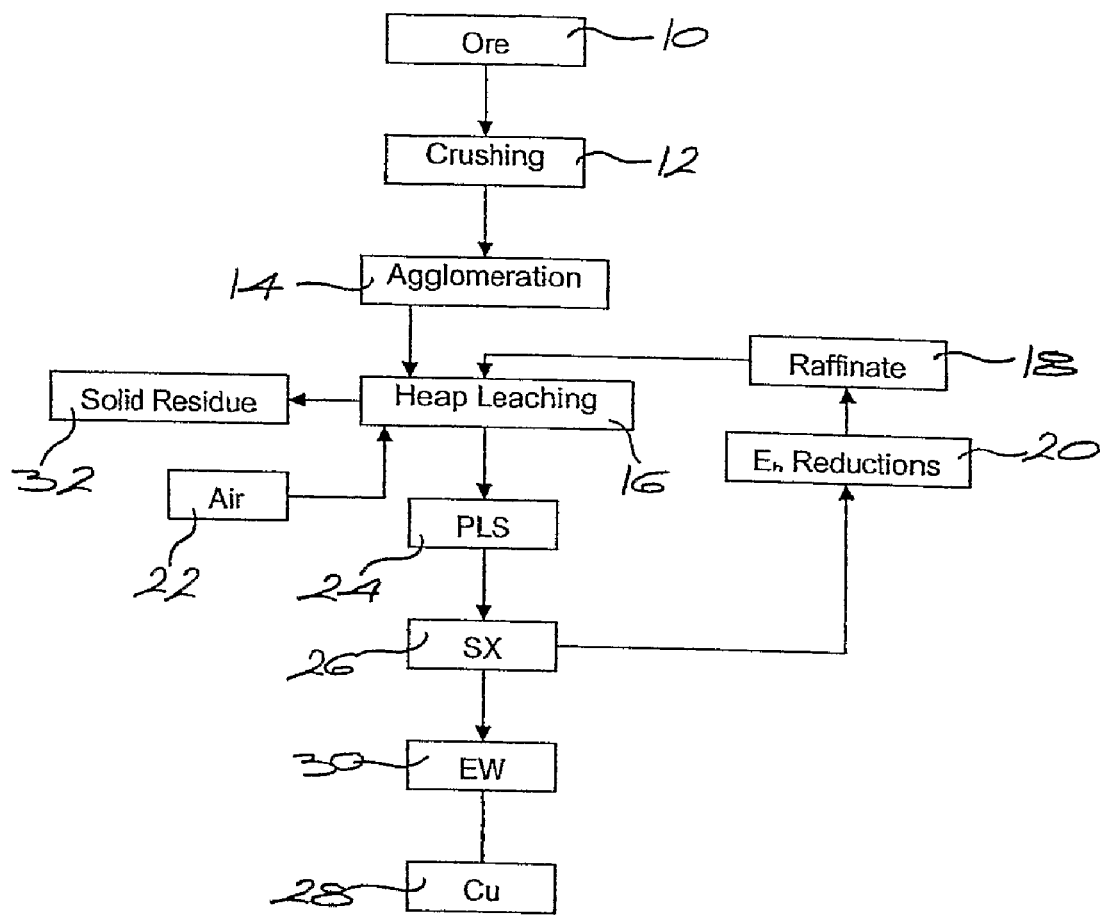
FIG. 8($a$) is a schematic diagram which illustrates heap leaching in which a raffinate Eh reduction is achieved via external raffinate treatment.

Various tests were conducted, to define certain key concepts of the method of the invention, on a variety of chalcopyrite-bearing samples which are summarized in Table 1. All potential values hereafter are reported against the Standard Hydrogen Electrode (SHE).

TABLE 1

Test Samples

| Sample ID | Type | Size | Cu(T) (% w/w) | CuFeS$_2$ (% w/w) | CuFeS$_2$ CSR[1] (% w/w) |
|---|---|---|---|---|---|
| Conc. A | Fine-milled concentrate | +25-38[2] (μm) | 29.8 | 82.5 | 90.2 |
| Conc. B | Fine-milled concentrate | +25-38[3] (μm) | 27.0 | 77.9 | 100 |
| Ore C | Crushed ore | −½" | 0.43 | 0.65 | 52.4 |

Notes:
[1] chalcopyrite copper source ratio (CSR);
[2] wet screened; and
[3] dry screened.

Example 1

The Effect of Solution Potential

Two batch leaching tests were conducted on a fine-milled, chalcopyrite-bearing concentrate (Conc. A) in 1 L glass beakers. The reaction mixtures or slurries of these each contained a solids concentration of 10 g/L and mixing of the slurry was achieved by magnetic stirring. Furthermore, the slurries were exposed to atmospheric air and regulated at 20° C. The acidity was controlled at pH 0.5 by the addition of 98% concentrated sulphuric acid ($H_2SO_4$) when required. The solution potential was not controlled.

The objective of these tests was to investigate the effect of solution potential, more specifically the effect of high against low potential, on the rate of chalcopyrite dissolution. For this purpose, Test I's solution contained only acid (98% $H_2SO_4$), distilled water and sodium chloride (NaCl) to render a low potential, whereas Test II's solution also included ferric sulphate ($Fe_2(SO_4)_3$) to render a relatively high potential. The details of the test conditions are summarized in Table 2.

TABLE 2

Test Conditions (Example 1)

| Test Type | Test Sample | Leach Solution Make-Up | Slurry Conditions |
|---|---|---|---|
| Reactor (Batch) | Conc. A | Test I:<br>[Cl$^-$]$_0$ = 10. g/L (NaCl)<br>pH 0.5 (98% $H_2SO_4$)<br>Test II:<br>[Cl$^-$]$_0$ = 10. g/L (NaCl)<br>[Fe$^{3+}$]$_0$ = 10 g/L (Fe$_2$(SO$_4$)$_3$)<br>pH 0.5 (98% $H_2SO_4$) | Acidity: pH 0.5<br>Aeration: Air (atmospheric)<br>Solids concentration: 10 g/L<br>Stirred<br>Temperature: 20° C. |

Notes:
1) the subscript, 0, refers to initial conditions (t = 0 h);
2) the slurry pH was controlled by the addition of 98% $H_2SO_4$;
3) the stirrer speed was controlled;
4) the slurry temperature was controlled; and
5) the solution potential was not controlled.

FIG. 3($a$) shows the copper dissolution transients of Tests I and II, and FIG. 3($b$) shows the corresponding solution potential values. The results show a copper dissolution of 70.4% achieved at low potential (in the absence of ferric ions) against only 6.87% at high potential (in the presence of ferric ions), over a period of 912 h.

Example 2

The Effect of Dissolved Oxygen

A series of batch leaching experiments were executed to test the effect of dissolved oxygen on the rate of chalcopyrite dissolution at low solution potential (in absence of ferric ions) and high solution potential (in presence of ferric ions). These were conducted on a fine-milled, chalcopyrite-bearing concentrate (Conc. B) in 100 mL shake flasks. The slurries each contained a solids concentration of 1 g/L and mixing was achieved by shaking the flasks at 200 rpm on an orbital shaker, in a temperature-controlled incubator.

Gaseous nitrogen, saturated with water vapour, was sparged into those slurries, which needed to be purged of dissolved oxygen. This was accomplished by sparging the gas into the slurry via two injection needles, which were inserted through a rubber septum that sealed off the flask. The slurries that did not need to be purged of dissolved oxygen were closed with a cotton wool stopper.

The details of the test conditions, which include the various solution make-ups, are summarized in Table 3. FIG. 4 depicts the results achieved after a period of 24 h, at 35° C. and 50° C.

TABLE 3

Test Conditions (Example 2)

| Test Type | Test Sample | Leach Solution Make-Up | Slurry Conditions |
|---|---|---|---|
| Flask (Batch) | Conc. B | Low Solution Potential: 0.2 M HCl<br>High Solution Potential: 0.2 M HCl, 0.1 M FeCl$_3$<br>0.2 M HCl, 0.1 M FeCl$_3$ & 0.5 M NaCl<br>0.2 M HCl, 0.1 M FeCl$_3$ & 1.0 M NaCl<br>0.2 M HCl, 0.1 M FeCl$_3$ & 1.5 M NaCl | Acidity: 0.2 M HCl<br>Gassed: Air or N$_2$<br>Shake flasks: 200 rpm<br>Solids concentration: 1 g/L<br>Temperature: 35° C. and 50° C. |

Notes:
1) the dissolved oxygen concentration was not controlled;
2) the shaking speed was controlled;
3) the slurry pH was not controlled;
3) the slurry temperature was controlled; and
4) the solution potential was not controlled.

The low solution potential (0.2 M HCl) results show a marked difference in overall copper dissolution achieved in the presence of dissolved oxygen (air) against dissolution in the absence of dissolved oxygen (N$_2$). For example, 22.2% (air) vs. 11.0% (N$_2$) at 35° C., and 43.5% (air) vs. 15.4% (N$_2$) at 50° C., were achieved after 24 h.

The high solution potential (0.2 M HCl, 0.1 M FeCl$_3$ & 0 M NaCl-1.5 M NaCl) results show no difference in overall copper dissolution, whether the tests were conducted in the presence or absence of dissolved oxygen, at both 35° C. and 50° C. Since this is the case, it can be concluded that under these conditions chalcopyrite is not oxidized by dissolved oxygen according to Equation 9.

Under these conditions the oxidative dissolution of chalcopyrite is mainly due to ferric ions and according to Equation 12:

$$CuFeS_2 + 4Fe(III) \rightarrow Cu(II) + 5Fe(II) + 2S° \qquad (12)$$

The results provide strong evidence of different reaction mechanisms present under conditions of high solution potential (in presence of ferric ions) against low solution potential (in absence of ferric ions). This is exemplified by the different effects that the presence of dissolved oxygen within the system has on the dissolution rate, e.g.:

- the rate increases at low potential (in absence of ferric ions); and
- the rate is not affected at high potential (in presence of ferric ions).

In addition,

- the rate is higher at low potential and in the presence of dissolved oxygen than at high potential (whether in the absence or presence of dissolved oxygen); and
- the rate is lower at low potential and in the absence of dissolved oxygen than at high potential (whether in the absence or presence of dissolved oxygen).

These results emphasize the importance of the role of dissolved oxygen when leaching is conducted under conditions of low solution potential (in absence of ferric ions).

Example 3

The Effect of Controlled Solution Potential in the Presence of Dissolved Oxygen The effect of controlled solution potential on the rate of chalcopyrite dissolution, in the presence of dissolved oxygen, was investigated:

- to confirm whether potential is a key driver in leaching chalcopyrite successfully in chloride or chloride/sulphate mixed systems; and, if so
- to define the potential range for optimum chalcopyrite leaching.

For this purpose, batch leaching experiments were initiated on a fine-milled, chalcopyrite-bearing concentrate (Conc. A) in 1 L glass reactors. Each reactor was fitted with baffles and sealed with a multi-port, poly-vinyl chloride lid, which supported a variable-speed, stirrer motor to drive an impeller to mix the slurry. Each reactor was also equipped with a redox sensor, glass sparger and inlets for sparging air, nitrogen or oxygen. The redox sensor measured the solution potential of the slurry, which was controlled to a set point value by means of a control loop from a Labview™ data acquisition system. The control loop caused the opening or closing of a solenoid valve, to allow for appropriate gas sparging. Each reactor was also enclosed in a temperature-controlled surround.

The batch leaching experiments were all conducted at 35° C., and controlled at the following respective solution potentials: 540 mV, 550 mV, 580 mV, 600 mV and 620 mV. The test at 540 mV was controlled at set point by sparging gaseous nitrogen, saturated with water vapour, into the slurry from t=100 h. The tests at 550 mV, 580 mV and 600 mV were all controlled by air injection. The test at 620 mV was initially operated by air injection; however, gaseous oxygen, saturated with water vapour, was sparged into the slurry from t=328 h. The details of the test conditions are summarized in Table 4.

TABLE 4

Test Conditions (Example 3)

| Test Type | Test Sample | Leach Solution Make-Up | Slurry Conditions |
|---|---|---|---|
| Reactor (Batch) | Conc. A | 0.2 M HCl<br>0.5 g/L Cu(T) (CuSO$_4$) | Acidity: 0.2 M HCl<br>Gassed: Air, N$_2$ or O$_2$<br>Solids concentration: 10 g/L<br>Solution potential:<br>540 mV (N$_2$)<br>550 mV (Air)<br>580 mV (Air) |

TABLE 4-continued

Test Conditions (Example 3)

| Test Type | Test Sample | Leach Solution Make-Up | Slurry Conditions |
|---|---|---|---|
| | | | 600 mV (Air) |
| | | | 620 mV (Air/$O_2$) |
| | | | Stirred: 1000 rpm |
| | | | Temperature: 35° C. |

Notes:
1) the dissolved oxygen concentration was not controlled;
2) the slurry pH was not controlled;
3) the slurry temperature was controlled;
4) the solution potential was controlled; and
5) the stirrer speed was controlled.

FIG. 5 shows the copper dissolution transients of the five leaching tests, with 30.3% (540 mV), 73.1% (550 mV), 79.2% (580 mV), 76.2% (600 mV) and 22.5% (620 mV) copper dissolution achieved after 1000 h. The 550 mV test achieved 88.0% after 1240 h.

Two boundary conditions can be established, viz a lower boundary at 550 mV and an upper boundary at 600 mV, which define the solution potential range to achieve optimum chalcopyrite dissolution rates within the systems under investigation. This is depicted in Equation 13:

$$550\ mV \leq Eh_{optimum} \leq 600\ mV \quad (13)$$

where $Eh_{optimum}$ is the solution potential for optimum rate of chalcopyrite dissolution, in mV.

The 540 mV results were achieved under gaseous nitrogen sparging, i.e. in the absence of dissolved oxygen. It is possible that the optimum solution potential range is bordered on the lower end by potentials lower than 550 mV. However, it is considered very difficult to achieve and maintain such low potentials in the presence of dissolved oxygen concentrations considered sufficient for optimum leaching purposes, within the systems under investigation.

The potentials pertain to bulk solution or slurry potential measurements against a platinum (Pt) electrode. However, diffusion effects can be ignored, because of the fact that a fine-milled (+25-38 μm), high-grade (+80%) and liberated chalcopyrite-bearing concentrate (Conc. A) was used in these experiments, and the fact that the reaction mixtures were all well stirred. Therefore, under these conditions of low potential, the bulk solution potential (Eh) and the potential at the chalcopyrite mineral's surface or mixed potential ($E_{mixed}$) are very much the same (Equation 14):

$$Eh \approx E_{mixed} \quad (14)$$

where Eh is the bulk solution potential, in mV; and $E_{mixed}$ is the mixed potential (at the chalcopyrite mineral's surface), in mV.

Equation 14 can be corroborated with potential measurements made with massive chalcopyrite electrodes during these and other tests. In addition, the following observations are made when the system is operated within the optimum solution potential range and in the presence of sufficient dissolved oxygen (more than 1 ppm), under the above conditions:
- continued linear kinetics, i.e. no leveling-off of the dissolution rate ("passivation");
- moles of copper leach to moles of iron leached indicate an almost 1:1 ratio over the whole leaching period;
- nearly complete chalcopyrite dissolution;
- rate of dissolution is largely independent of potential; and
- rate of dissolution is constant at $\pm 3 \times 10^{-12}$ mol Cu/cm$^2$·s.

Example 4

The Effect of Controlled Solution Potential in the Absence of Dissolved Oxygen

The importance of the presence of dissolved oxygen on the rate of chalcopyrite dissolution under conditions of low solution potential (in the absence of ferric ions) has already been illustrated in Example 2. In order to confirm this under conditions of controlled potential, more specifically within the optimum potential range of 550 mV to 600 mV, some batch leaching experiments were performed in the absence of dissolved oxygen.

The tests were executed on a fine-milled, chalcopyrite-bearing concentrate (Conc. A) in the same 1 L glass reactors as described in Example 3. The tests were all conducted at 35° C. under gaseous nitrogen (saturated with water vapour), and at 550 mV, 580 mV and 600 mV. The solution potential was controlled at the desired set point by controlling the Cu(II)/Cu(I) ratio by means of electrical current. The test condition details are summarized in Table 5.

TABLE 5

Test Conditions (Example 4)

| Test Type | Test Sample | Leach Solution Make-Up | Slurry Conditions |
|---|---|---|---|
| Reactor (Batch) | Conc. A | 0.2 M HCl<br>0.5 g/L Cu(T)<br>(CuSO$_4$) | Acidity: 0.2 M HCl<br>Gassed: N$_2$<br>Solids concentration: 10 g/L<br>Solution potential:<br>550 mV<br>580 mV<br>600 mV<br>Stirred: 1000 rpm<br>Temperature: 35° C. |

Notes:
1) the slurry pH was not controlled;
2) the slurry temperature was controlled;
3) the solution potential was controlled; and
4) the stirrer speed was controlled.

FIG. 6 shows the copper dissolution transients of these tests in comparison with those achieved at corresponding solution potentials, in the presence of dissolved oxygen (in Example 3). The overall copper dissolutions after a period of 1000 h are as follows:
550 mV: 73.1% (air) vs. 14.8% (N$_2$);
580 mV: 79.2% (air) vs. 14.2% (N$_2$); and
600 mV: 76.2% (air) vs. 15.0% (N$_2$).

The results show that, in order to achieve optimum chalcopyrite dissolution rates, it is essential to have dissolved oxygen present in the system, even when the solution potential is controlled within the optimum range of 550 mV to 600 mV.

Example 5

The Feasibility of a Two-Stage (Reductive/Oxidative) Leach

A batch leaching experiment was conducted to test whether chalcopyrite could also be leached successfully by the use of a variation of the aforementioned techniques of the invention. This constituted a two-stage leach, which included a period of initial leaching under reducing conditions of low solution potential (Stage 1), followed by leaching under oxidative conditions (Stage 2).

The test was conducted on a fine-milled, dry screened (+25-38 µm) sample of a chalcopyrite-bearing concentrate (Conc. A) in a 1 L glass reactor (as described in Example 3). The slurry contained a solids concentration of 10 g/L and the temperature was controlled at 35° C. In order to achieve low solution potentials, the slurry was maintained deaerated by continuous sparging with gaseous nitrogen (saturated with water vapour) for the first 139 h (Stage 1); thereafter, a higher potential was affected by means of gaseous oxygen (saturated with water vapour) sparging (Stage 2). The details of the test conditions are summarized in Table 6.

TABLE 6

Test Conditions (Example 5)

| Test Type | Test Sample | Leach Solution Make-Up | Slurry Conditions |
|---|---|---|---|
| Reactor (Batch) | Conc. A | 0.2 M HCl<br>0.5 g/L Cu(T)<br>($CuSO_4$) | Acidity: 0.2 M HCl<br>Gassed: $N_2$ and $O_2$<br>Solids concentration: 10 g/L<br>Stirred: 1000 rpm<br>Temperature: 35° C. |

Notes:
1) the slurry pH was not controlled;
2) the slurry temperature was controlled;
3) the solution potential was not controlled; and
4) the stirrer speed was controlled.

FIGS. 7(a) and 7(b) show the copper dissolution and solution potential profiles for this test. Initially, very little copper dissolved during the period of nitrogen sparging, with only 11.1% dissolution achieved after 139 h. The potential was as low as 500 mV over this period (Stage 1). The rate of copper dissolution increased significantly on introduction of oxygen, with an overall dissolution of 95.5% achieved after 787 h. The potential ranged from 570 mV to 591 mV over this period (Stage 2).

The preceding tests were conducted primarily on chalcopyrite (for which the optimum solution potential range applies) but are deemed to be equally applicable to bornite, chalcocite, covellite and enargite and, more generally, to copper sulphide minerals.

Figure 8B:
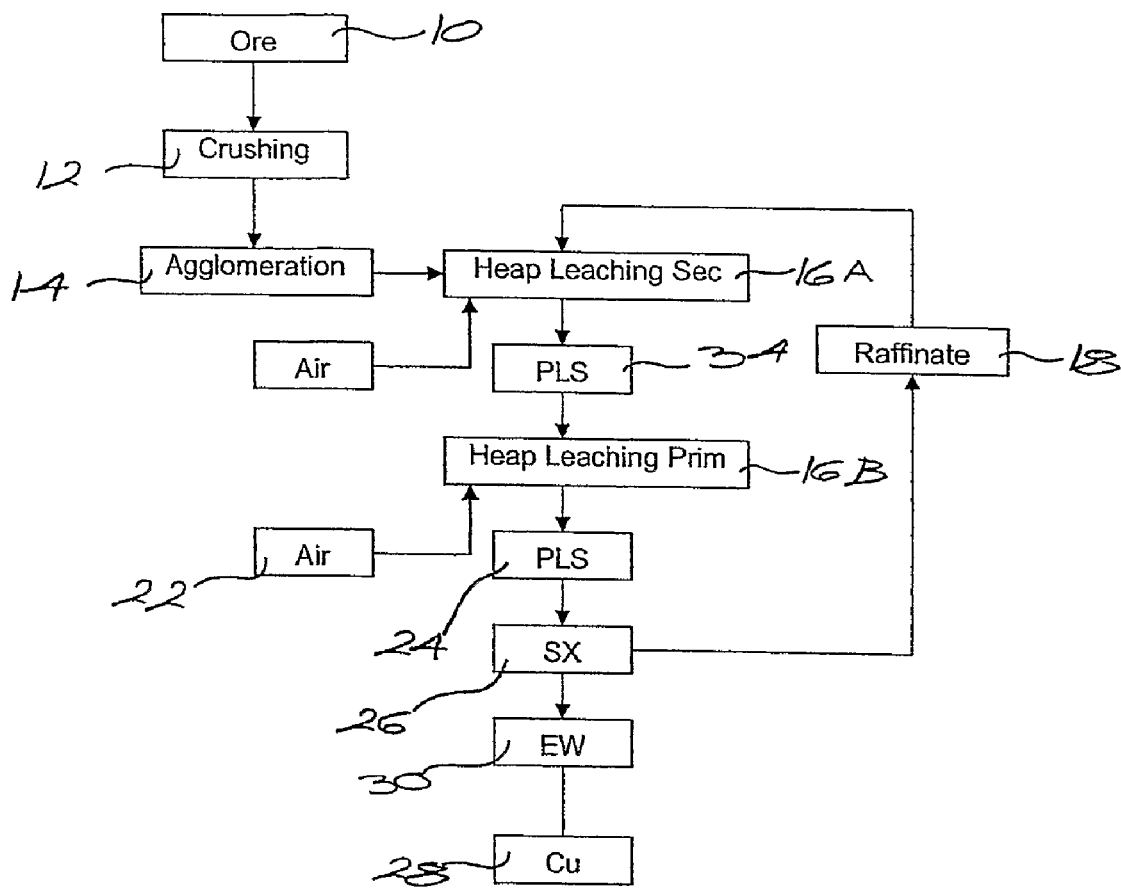

FIGS. 8(a) and 8(b) are block diagram representations of the use of the method of the invention in two heap leaching processes.

In FIG. 8(a) ore 10 (ore C) is crushed (12) and agglomerated (14) with an aqueous acidic solution with a pH of below 2.0. This solution may be process raffinate or a solution in which the pH is controlled in any appropriate manner, for example by the addition of $H_2SO_4$, HCl or $HNO_3$. The agglomeration (14) has two advantages viz it controls the amount of fine ore material which affects the percolation and aeration of the heap, and it solubilises acid-soluble secondary copper sulphides. This solubilization can be increased by allowing the agglomerated ore to cure before irrigating the heap. If an aqueous acidic solution is used for agglomeration, this solution may contain chloride at a level of 5 to 100 g/L added via suitable any chloride salt including NaCl, $MgCl_2$, saline water ("salares"), sea water or chloride containing process water.

After stacking and curing (if required), the heap is leached (16) by irrigating the ore with a leach solution 18 with a pH of 2.0 or below, preferably 1.0. If the solution is a fresh leach solution, then it may contain the following: chloride at a level of 5 to 100 g/L added via HCl or any suitable chloride salt including NaCl, $MgCl_2$ or sea water; copper at a level of 0.05 to 10 g/L added via the corresponding chloride or sulphate salts; and iron at a level of 0 to 20 g/L added via the corresponding chloride or sulphate salts. If a mature raffinate solution is used as the leach solution, then the chloride and iron levels can be controlled by the plant equilibrium conditions and the level of copper by the solvent extraction return. It may be necessary to supplement the levels of these constituents, in the manner already described, to achieve the required levels for optimum leaching.

The solution potential of the leach solution should preferably be maintained below 620 mV (vs. SHE), e.g. by manipulating the composition of the leach solution or via active potential reduction.

Active potential reduction (20) may be achieved by passing the leach solution through a column containing material such as copper metal, certain types of activated carbon, by the addition reducing agents such ascorbic acid, by bubbling $SO_2$ or CO through the solution, or by promoting jarosite precipitation.

Air 22 is introduced at the base of the heap to raise the dissolved oxygen level in the ore. The pregnant liquor solution 24 from the heap is subjected to solvent extraction 26 and copper 28 was then recovered by electrowinning 30. Solid residue 32 from the leached heap is disposed of in any suitable way.

FIG. 8(b) shows a modified process wherein the potential of the leach solution is reduced to the required level for primary copper sulphide leaching by first irrigating a heap consisting of secondary copper sulphide minerals 16A. The pregnant leach solution 34 of this heap is then used to irrigate a heap consisting of primary copper sulphide minerals 16B.

As variations to the process of FIG. 8(b), it is possible to build a heap with an upper layer of secondary copper sulphide minerals which are sufficient to lower the solution potential to the required level for the rest of the heap (primary copper sulphide minerals in a lower layer) or to agglomerate milled secondary copper sulphide minerals onto primary copper sulphide minerals to in-situ lower the leach solution potential to the required level.

As noted the required dissolved oxygen level in the heap (1 ppm or higher) may be obtained via the aeration system 22 which is installed at the bottom of the heap during construction. Alternatively or additionally the desired dissolved oxygen level can be obtained by high irrigation flow rates with a raffinate aerated before irrigation.

REFERENCES

1. Majima, H. Awakura, Y., Hirato, T. and Tanaka, T., The Leaching of Chalcopyrite in Ferric Chloride and Ferric Sulphate Solutions, Can. Metall. Q., 24(4), 1985, pp. 283-291.
2. Hirato, T., Kinoshita, M., Awakura, Y. and Majima, H., The Leaching of Chalcopyrite in Ferric Chloride, Metal. Trans., 17B, 1986, pp. 19-28.
3. Dutrizac, J., The Leaching of Sulphide Minerals in Chloride Media, Hydrometallurgy, 29, 1992, pp 1-45.
4. Nicol, M. J., Kinetics of the Oxidation of Copper (I) by Oxygen in Acidic Chloride Solutions, S. Afr. J. Chem., 37, 1984, pp. 77-80.

The invention claimed is:

1. A hydrometallurgical method of recovering copper from a material, in a heap, that contains a copper sulphide mineral which contains at least chalcopyrite comprising leaching the material in an acidic chloride solution or a mixed chloride/sulphate solution in the presence of dissolved oxygen and maintaining the mineral's surface potential within a range of 550 mV (vs. SHE) to 600 mV (vs. SHE) by controlling the chloride ion concentration at a level between 5 g/L to 100 g/L to control the ratio of Cu(II) to Cu(I) within the solution to cause dissolution of at least 40% of the copper sulphide in about 600 hours, and recovering copper from the solution.

2. The method according to claim 1 wherein the copper sulphide is in a low-grade transitional and hypogene ore.

3. The method according to claim 1 wherein the copper sulphide is in a low-grade supergene ore.

4. The method according to claim 1 wherein the pH of the solution is less than about 3.

5. The method according to claim 4 wherein the pH of the solution is between about 1 and about 2.

6. The method according to claim 1 which includes the steps of controlling the pH of the solution by the addition of $H_2SO_4$, HCl or $HNO_3$.

7. The method according to claim 1 wherein the dissolved oxygen level is in excess of 1 ppm.

8. The method according to claim 1 wherein the chloride concentration is controlled by the addition of at least one of the following: HCl, NaCl, $MgCl_2$, saline water, sea water or chloride-containing process water.

9. The method according to claim 1 comprising maintaining the mineral's surface potential within a range of 550 mV (vs. SHE) to 580 mV (vs. SHE).

10. The method according to claim 1 wherein the leaching solution contains less than about 5 g/L ferric ion.

11. The method according to claim 1 wherein the leaching solution does not contain any ferric ions.

12. The method according to claim 1 wherein the leaching is conducted at ambient temperature.

* * * * *